United States Patent [19]

Jakubowski et al.

[11] 4,448,845

[45] May 15, 1984

[54] HALOGENATED POLAR POLYMER TREATMENT OF INORGANIC FILLERS

[75] Inventors: James J. Jakubowski; Victor E. Meyer; Ronald R. Pelletier, all of Midland, Mich.

[73] Assignee: The Dow Chemical Company, Midland, Mich.

[21] Appl. No.: 426,558

[22] Filed: Sep. 29, 1982

[51] Int. Cl.³ ............................................. B05D 7/00
[52] U.S. Cl. .................................. 428/404; 427/221; 428/406; 428/407
[58] Field of Search ................ 427/221; 428/406, 407, 428/404; 523/201

[56] References Cited

U.S. PATENT DOCUMENTS

| | | | |
|---|---|---|---|
| 2,472,680 | 6/1949 | Pratt | 427/221 |
| 2,883,356 | 4/1959 | Glueskamp | 260/37 |
| 2,984,635 | 5/1961 | Harris | 427/221 |
| 3,884,871 | 5/1975 | Herman | 260/42.14 |
| 3,897,586 | 7/1975 | Coker | 428/404 |
| 3,965,284 | 6/1976 | Xanthos et al. | 428/404 |
| 4,062,692 | 12/1977 | Hemmerich et al. | 106/300 |
| 4,124,562 | 11/1978 | Yui et al. | 260/42.14 |
| 4,198,333 | 4/1980 | Bonin et al. | 260/33.2 R |

*Primary Examiner*—Michael R. Lusignan
*Assistant Examiner*—Janyce A. Bell
*Attorney, Agent, or Firm*—J. S. Boone

[57] ABSTRACT

Filler particles useful for filling organic resins such as polyethylene are produced by mixing a filler, such as calcium carbonate, with a halogenated polar polymer such as a halogenated ethylene/acrylic acid copolymer. The fillers of the invention impart improved physical properties such as tensile, flexural and impact strength to organic resins.

10 Claims, No Drawings

HALOGENATED POLAR POLYMER TREATMENT OF INORGANIC FILLERS

BACKGROUND OF THE INVENTION

This invention relates to surface coated fillers, especially surface coated inorganic fillers useful in organic moldable resins.

The relative high price and short supply of organic resin feedstocks, especially those useful for producing molded products, have caused many processors to incorporate fillers into the resins before final processing. Since, on a volume basis, fillers are less expensive than organic resins, filled resin products will have a lower raw materials cost than similar unfilled products of the same volume.

As well as lowering cost, fillers will often either increase or decrease certain physical properties. Desirably, a filler will either have no effect on, or will improve each property. While many manufacturers of fillers claim that their products will improve certain properties, these improvements are often minimal or nonexistant. Further, they often also deleteriously affect other properties.

One significant problem encountered when fillers are incorporated into organic resins is that, while the resins are relatively hydrophobic, fillers are typically hydrophilic. This causes processing problems, in that it is difficult for the resin to "wet" the filler. One method used to circumvent this problem is wetting the filler with organic compounds such as mineral oil, calcium stearate, organic titanates, organic silanes, and stearic acid. Another method has been to polymerize a capsule of organic polymer around the filler particles. Each of the these methods, however, suffers from various inherent inefficiencies and side effects such as high energy requirements, high materials cost, and poor filled resin properties.

A more recently developed process has been to coat fillers with organic polymer from a "slurry." This process is described in U.S. patent application Ser. No. 265,761, filed May 21, 1981, now abandoned. While certainly an operable method, even this method suffers from problems. Specifically, when fillers prepared by this method are placed into an organic resin, their physical properties are still not as great as would be desired. Further, this method is inoperable for acidic fillers such as glass beads, silica, and many clays. Further drawbacks of the slurry treatment method include the high cost of drying fillers coated from aqueous slurries and freezing problems in cold climates.

An even more recent advance has been the "dry treatment" taught by U.S. patent application Ser. No. 379,220, filed May 17, 1982. While this method is a marked improvement over the aforementioned "slurry" process, it would still be desirable to have improved physical performance of organic resins filled with coated fillers.

SUMMARY OF THE INVENTION

In one aspect, the invention is a method of coating a filler particle in which the filler is contacted with an effective amount of a halogenated polar polymer. In another aspect, the invention is a coated filler produced by the aforementioned method. In yet another aspect, the invention is a filled organic resin comprising a mixture of an organic resin and the aforementioned coated filler.

Fillers produced according to the invention are convenient and economical to manufacture. Organic resins filled with the fillers of the invention have superior physical properties, such as tensile strength and flexural strength, compared to resins containing fillers treated with nonhalogenated polymers.

DETAILED DESCRIPTION OF THE INVENTION

The invention requires the use of an alkali-dispersible halogenated polar polymer. By "polar" is meant that a sufficient number of monomer units of the polymer (without halogenation) have sufficient dipole moment that after halogenation the polymer will impart improved physical properties to an organic resin filled with a filler that has been coated with the halogenated polar polymer, compared to resins filled with fillers coated with halogenated nonpolar polymers. Although the halogenated polar polymer may be prepared by any convenient means, preferably it is prepared by first synthesizing an unhalogenated polar polymer and subsequently halogenating it.

The polar polymer may be either an addition or condensation polymer, but preferably is an addition polymer produced by the radical chain polymerization of alkene monomers, including at least one polar monomer. Examples of suitable polar addition polymers include those polymerized from unsaturated polar monomers such as unsaturated acids, acid anhydrides, acid salts, alcohols, esters, and so forth.

In a particularly preferred embodiment, the halogenated polar polymer is a halogenated polymer of (1) an addition polymerizable organic monomer which does not contain an acid group (non-acid monomer), and (2) an addition polymerizable acid (acid monomer); hereinafter referred to as the "acid polymer."

The halogenated acid polymer is conveniently prepared by first preparing an unhalogenated acid polymer and subsequently halogenating it. The unhalogenated acid polymer is conveniently prepared by copolymerizing the non-acid monomer and the acid monomer. Suitable conditions for preparing the unhalogenated acid polymer and the halogenated acid polymer are described hereinafter.

The organic monomer which does not contain an acid group (non-acid monomer) may be any of a wide variety of water-insoluble addition polymerizable monomers provided that the monomer does not contain functional groups which will ionize or otherwise react with the acid monomer. Representative of suitable monomers include esters of unsaturated alcohols, such as ethyl methacrylate, and unsaturated aromatic monomers such as styrene. Preferred monomers include hydrophobic, water-insoluble monomers which produce hydrophobic, water-insoluble polymers. A particularly preferred class of monomers includes acyclic alkenes having terminal unsaturation.

The term "acyclic alkene having terminal unsaturation" is meant to include any noncyclic compound having a terminal, addition polymerizable double bond, as long as the compound is copolymerizable with the acid comonomer component. Preferably, the term is limited to those compounds which, when copolymerized with the acid monomer, will form a polymer that is dispersible in an aqueous alkaline medium. Examples include ethylene, propylene, 1-butene, and 1,3-butadiene. Ethylene and propylene are preferred, and ethylene is most preferred. Of course, mixtures of these monomers may be used. For example, comonomers containing ethylene and a lesser amount of propylene are suitable.

The acid monomer may be of a wide variety of addition polymerizable acids. The term "addition polymerizable acid" is meant to include any ethylenically unsaturated compound having an acid group, provided that the compound is copolymerizable with the non-acid monomer component.

The term "acid group" is meant to include any group capable of neutralization by aqueous alkali to form water-ionizable salt groups. Preferred acid groups include sulfonic ($-SO_3H$), carboxy ($-CO_2H$), and carboxylic acid anhydride groups. Carboxylic acids having monoethylenic unsaturation are preferred. Examples of such suitable acids include sulfur-based acids such as 2-sulfoethyl methacrylate (SEM) and 3-acrylomido-2-methylpropane sulfonic acid (AMPS), and carboxylic acids such as itaconic acid, acrylic acid, methacrylic acid, fumaric acid, maleic acid, vinyl benzoic acid and isopropenyl benzoic acid. The more preferred species include acrylic, methacrylic, fumaric, itaconic and maleic acids. Most preferred is acrylic acid. Mixtures of these acids may also be used.

Especially in instances where preferred classes of monomers are used, it may be desirable to include other monomers in minor amounts as long as the final properties of the dispersed solid are not significantly impaired and, preferably, the polymer remains alkali dispersible. For instance, when ethylene and acrylic acid are used, it may be desirable to include minor amounts (e.g., 5 weight percent) of a monomer such as styrene.

The non-acid monomer and acid monomer are combined in proportions such that the final halogenated acid polymer will improve the strength of an organic resin filled with an inorganic filler which has been coated with the polymer, compared to a resin filled with a filler which has been coated with a similar halogenated polymer which does not contain a polar monomer. Preferably, the final polymer also will be dispersible in an aqueous alkaline medium. U.S. Pat. Nos. 3,472,825 and 3,779,901 provide information useful in predicting which polymers will be water dispersible in aqueous alkali (see especially Table I of U.S. Pat. No. 3,472,825). Generally, the copolymers of the instant invention desirably have from 5 to 35 weight percent, more desirably from 10 to 30 weight percent, preferably 15 to 25 weight percent and most preferably about 20 weight percent acid monomer, the remainder being non-acid monomer.

In preparing the acid polymer, the monomers are reacted using conventional polymerization techniques to produce a normally solid, thermoplastic polymer. While not critical to the practice of the invention, the polymer is conveniently prepared such that the molecular weight of the polymer and the quantity of acid monomer present produce a melt flow viscosity of desirably 100 to 500, more desirably 200 to 400, preferably 275 to 325 and more preferably about 300 decigrams/minute (as measured by ASTM D-1238-65T, Procedure A, Condition E).

After polymerization, the polar polymer is halogenated. The halogenation is conviently carried out by heating the polar polymer in the presence of a molecular halogen. In a preferred embodiment, the molecular halogen is a gas, and the polar polymer is heated in the presence of a liquid which is a poor solvent for the unhalogenated polar polymer, but which is a good solvent for the halogenated polar polymer. The halogenated polar polymer may then be recovered by conventional precipitation. The polar polymer needs to be heated with the halogen for only a relatively short period of time (e.g., 1.5 hours) and at relatively moderate temperature (e.g., 70° C).

As the halogen, any halogen is suitable, however, chlorine is preferred. The halogen may be in the form of a heterogeneous molecule (e.g., ClBr, FCl, etc.), but is preferably a homogeneous molecule (e.g., $Cl_2$, $Br_2$, etc.). Mixtures of different halogen molecules may be used.

The unhalogenated polar polymer is halogenated to a strength enhancing amount. That is, sufficient halogenation is provided so that an organic resin, filled with an inorganic filler which has been coated with the halogenated polar polymer will have greater physical strength than a similar filled resin wherein the filler has been coated with an unhalogenated polar polymer. Typically, the polar polymer will be halogenated such that it will have desirably about 2 to about 90, more desirably about 5 to about 30, and preferably about 8 to about 15 halogen atoms per 100 monomer unit.

While the halogenated polar polymer has been described as being prepared by halogenation of an unhalogenated polar polymer, any method which produces a similar polymer is acceptable. For instance, one could synthesize a polymer of an addition polymerizable monomer having a halogen bonded to one of the carbon atoms which form the double bond. Examples of such polymers include homopolymers or copolymers of chloroacrylic acid (2-chloropropenoic acid), copolymers of vinyl chloride or vinylidene chloride with an acid monomer, and so forth.

After halogenation, the polar polymer is coated onto the surface of a filler. The term "filler" is meant to include not only materials typically added to resins principally as an agent for adding volume, but it is also meant to include materials such as pigments, dyes, and other usually solid particulate additives. The "fillers" are generally finely divided solids, for instance solids having particle diameters of about 0.05 to about 50 microns. Fillers useful in the instant invention include generally any filler suitable for filling organic resin. The filler may be either basic or acidic in character. Examples of suitable fillers include calcium carbonate, talc, alumina trihydrate, titanium dioxide, lead chromate, mica, glass, and silica. It is generally known in the art that resins filled with small particle size fillers perform better than those filled with larger particles. This relationship holds true for the fillers of the instant invention.

The particular method used to put the polymer on the filler surface may vary depending upon the particular halogenated polar polymer, filler, and manufacturing equipment being used. Suitable methods include blending the filler with melted, dissolved, dispersed, or powdered halogenated polar polymer. An "in situ" treatment wherein the filler is coated during the melt blending of the filler and filled resin is possible by adding the halogenated polar polymer to a mechanical blend of filler and organic resin.

In a series of particularly preferred embodiments, a halogenated acid polymer is used in an aqueous coating process to treat the filler.

While the halogenated acid polymer is generally insoluble in water, in preferred forms, it may be dispersed in an aqueous alkaline solution. This solution forms a salt with the acid component of the polymer. U.S. Pat. No. 3,779,901 teaches processes and conditions for dispersing the polymer. Desirably, a salt is formed with a monovalent anion. Preferably, a sodium or ammonium salt is formed. This copolymer is generally added in sufficient quantity to form a dispersion having desirably 1 to 50 percent and preferably 5 to 30 percent by weight solids.

The filler is desirably treated by blending it with the halogenated acid polymer dispersion. One method of blending the filler and the halogenated acid polymer is the "slurry method" taught by the U.S. patent application Ser. No. 265,761, filed May 21, 1981, now abandoned. While not most preferred, this method is suitable for use with the invention. A greatly preferred method of blending the halogenated acid polymer and the filler is the "dry treatment" taught by U.S. patent application Ser. No. 379,220, filed May 17, 1982. In this preferred process, the total quantity of water used should be sufficiently small that a slurry of the filler is not formed. That is, although the fillers may be wet, there should not be so much water present to form a fluid medium in which individual filler particles may be suspended. That is, the wet fillers should not have sufficient water present to be a stable dispersion nor a pourable fluid. The polymer and filler are desirably mixed until they are uniformly combined. Sufficient mixing typically may take place in a comparatively short period of time, for instance, 5 to 60 minutes. Any conventional mixing equipment may be used.

Regardless of the treatment method, the polymer is desirably added to the filler in an "effect amount," that is, an amount sufficient to either lower the viscosity of a mixture of the filler and an organic resin, or to increase the physical properties of an organic resin filled with the filler. While the proportion of polymer to filler may vary over a wide range, generally the polymer will be present at about 0.5 to about 5.0 percent, more desirably from about 0.75 to about 3.0 percent, and preferably from about 1.0 to about 2.0 percent by weight, based on the weight of the filler. A minimum amount of polymer is needed to have a significant effect, but excess will generally be of no benefit.

After treatment, the filler is desirably dried and any aggregates broken up to return them to nearly their original particle size. Drying techniques which involve substantial agitation of the filler will minimize the formation of chunks.

While the treated fillers of the instant invention may be used in a variety of organic resins, such as polyacrylates, polystyrene, polycarbonate, etc., they are especially well suited for use in olefin polymers such as polyethylene, polypropylene, and copolymers of ethylene and one or more higher olefins. They are particularly suited for use in high density polyethylene. When used in polyethylene, they exhibit unexpectedly superior properties such as tensile strength and flexural strength.

The treated fillers of the instant invention may be incorporated into organic resins in the same manner and in the same percentages as untreated fillers are normally incorporated. These fillers offer an advantage in incorporation into the resin in that less time and energy are required to mix the filler and resin. In many instances, it may be possible to add higher percentages of filler than would normally be the case because of the superior properties imparted by the treated filler. Desirably, the fillers of the instant invention are incorporated into the organic resin in the range of 20 to 85 percent by weight based on the weight of the organic resin. More desirably, the fillers are present in the range of from 40 to 80 weight percent.

Further details of the invention will be apparent from the following examples. In the examples, unless otherwise specified, all parts and percentages are by weight. The $CaCO_3$ used is a 3000 nm particle diameter particulate available from Genstar Stone Products, Hunt Valley, MD, USA, under the trademark Camel Wite ®; and the polyethylene used is a typical molding grade high density polyethylene having a melt flow index of 0.3 and a density of 0.972 gram/cc. In the tables, values in parenthesis are standard deviations; tensile properties are measured by ASTM D-638-77A with a type I specimen; impact resistance is measured by ASTM D-256-78, Method A (Izod type); flexural properties are measured by ASTM 3-790-71 (78), Method I; strength and elongation are values at yield unless otherwise indicated; and the physical performance of the filled polyethylene is evaluated with compression molded specimens.

EXAMPLE 1

To a 300-ml, 3-necked flask equipped with an inlet port for $Cl_2$ gas, a reflux condenser, and an agitator are placed 50.0 g of ethylene/acrylic acid copolymer (20 weight percent acrylic acid, 300 melt index), 0.5 g benzoyl peroxide and 200.0 g carbon tetrachloride. With agitation, the contents of the flask are maintained under a $Cl_2$ blanket for 1.5 hours at 70° C. An observation is made that with increasing chlorination the polymer becomes more soluble in the carbon tetrachloride. After chlorination, the polymer is recovered by precipitation into methanol, followed by vacuum drying at 50° C. for 24 hours. The increase in weight from 50.0 to 55.1 g indicates that the polymer now contains 10.3 weight percent chlorine.

10 Grams of the chlorinated ethylene/acrylic acid copolymer prepared above, 4.0 g ammonium hydroxide, and 86.0 g deionized water are placed in a citrate bottle and heated with gentle agitation for about 20 hours at 90° C. The resulting dispersion is filtered though a fine mesh paint and varnish filter to insure that no large particles remain. The product is a 10.6 weight percent solids dispersion of the copolymer.

300 Grams of calcium carbonate are dispersed in 300 g of water. With stirring, 28.3 g of the chlorinated ethylene/acrylic acid dispersion prepared above are added, and the slurry is stirred for 1 hour. The slurry is then centrifuged, washed with deionized water, and dried overnight at 125° C. The dried cake is then broken up into small chunks and placed into a plastic bottle along with several stainless steel rods, and milled overnight.

The dried, treated filler is found to be hydrophobic. When dusted onto water, the treated filler floats and is not wet by water, even after stirring, however untreated filler is easily wet by water and sinks.

A mixture of 60 percent high density polyethylene and 40 percent calcium carbonate (as treated above) is blended on a Brabender mixer (head temperature 175° C., 63 rpm) for 10 minutes. To obtain enough material for mechanical testing, 3 Brabender runs are combined into 1 sample. This sample is ground, and compression molded specimens are prepared. The specimens are then evaluated for tensile, flexural and impact properties.

The above procedures are repeated, using calcium carbonate which has not been treated, calcium carbonate which has been treated with ethylene/acrylic acid copolymer which has not been chlorinated, and calcium carbonate which has been treated with a chlorinated paraffin (Chlorez 725-S, available from Dover Chemical Company, Dover, Ohio, USA). In some of the runs (designated "in situ" treatment), the treating polymer is added to a mechanical mixture of the polyethylene and calcium carbonate. This mixture is then placed into a Brabender mixer and melt blended.

The results are shown in Table I.

TABLE I

| | | 40% CaCO$_3$—HDPE | | | | | | |
|---|---|---|---|---|---|---|---|---|
| | | Tensile Strength | | Tensile Modulus | Tensile Elongation | Breakwork | Flexural Strength | Flexural Modulus | Impact Strength |
| Sample | Treatment | Y or B[1] | psi | psi × 10$^5$ | % | in-lbs/in$^3$ | psi | psi × 10$^5$ | ft-lbs/in |
| 1-1 | 1% Cl—EAA[3] dispersion | Y | 3718 | 1.6 | 6.6 | 217 | 4816 | 2.6 | 0.83 |
| | | B | 3683 | | 7.8 | | | | |
| 1-2[2] | 1% Cl—EAA[3] dispersion | Y | 3917 | 1.6 | 6.6 | 897 | 5020 | 2.7 | 0.88 |
| | | B | 1724 | | 33.2 | | | | |
| 1-3 | 1% Cl—EAA[4] in situ | Y | 3801 | 1.9 | 4.6 | — | 4883 | 2.6 | 0.92 |
| | | B | 3298 | | 11.6 | | | | |
| 1-4 | 2% Cl—EAA[4] in situ | Y | 3732 | 2.5 | 5.0 | 392 | 5870 | 2.5 | 1.19 |
| | | B | 3429 | | 11.7 | | | | |
| 1-5* | none | Y | 3511 | 3.0 | 4.7 | 261 | 4678 | 2.1 | 0.75 |
| | | B | 3401 | | 8.6 | | | | |
| 1-6* | 1% EAA dispersion | Y | 3322 | 3.0 | 4.5 | 233 | 4577 | 2.1 | 0.63 |
| | | B | 3055 | | 8.1 | | | | |
| 1-7* | 1% EAA in situ | Y | 3415 | 2.1 | 4.9 | 388 | 4942 | 2.4 | 0.67 |
| | | B | 2639 | | 11.6 | | | | |
| 1-8* | 1% Chlorez in situ | Y | 3773 | 1.8 | 5.5 | — | 5114 | 2.5 | 0.60 |
| | | B | 3542 | | 8.7 | | | | |
| 1-9* | 2% Chlorez in situ | Y | 3563 | 2.0 | 4.0 | 188 | 5330 | 2.8 | 0.57 |
| | | B | 3298 | | 7.0 | | | | |

*Not an example of the invention.
[1] Y equals measurement at yield; B equals measurement at break.
[2] Sample 1-2 is a repetion of Sample 1-1.
[3] 10.3 Percent chlorination.
[4] 11.0 Percent chlorination.

What is claimed is:

1. A method for coating a particulate filler comprising the steps of:
   contacting the filler with an effective amount of a halogenated polar polymer comprising a reaction product of a molecular halogen and an unhalogenated polar polymer comprising an addition polymerizable organic monomer which does not contain an acid group; and an addition polymerizable acid; and mixing the halogenated polar polymer with the filler particles such that the halogenated polar polymer forms an adherent coating on the filler particle.

2. The method of claim 1 wherein the addition polymerizable organic monomer which does not contain an acid group is an acyclic alkene having terminal unsaturation.

3. The method of claim 2 wherein the acyclic alkene is selected from the group consisting of ethylene, propylene and 1-butene.

4. The method of claim 2 wherein the acyclic alkene is ethylene.

5. The method of claim 1 wherein the addition polymerizable acid is a monoethylenically unsaturated carboxylic acid.

6. The coated filler produced by the method of claim 1.

7. A composite comprising a blend of the coated filler of claim 6 and an organic resin.

8. The composite of claim 7 wherein the organic resin is polyethylene.

9. The addition polymerizable acid of claim 5 wherein the monoethylenically unsaturated carboxylic acid is acrylic acid.

10. The method of claim 1 wherein the unhalogenated polar polymer is ethylene acrylic acid.

* * * * *